United States Patent [19]
Glass et al.

[11] 3,973,773
[45] Aug. 10, 1976

[54] GAME APPARATUS

[75] Inventors: Marvin I. Glass, Chicago; Gordon A. Barlow, Skokie; Gunars Licitis, Lombard, all of Ill.

[73] Assignee: Marvin Glass & Associates, Chicago, Ill.

[22] Filed: Jan. 24, 1972

[21] Appl. No.: 220,314

[52] U.S. Cl. ............................... 273/94 R; 353/30
[51] Int. Cl.² ......................................... A63F 9/00
[58] Field of Search ................ 273/94 R, 85 R, 88; 35/53; 353/30, 34, 35, 17, 82, 108, 120

[56] References Cited
UNITED STATES PATENTS

| | | | |
|---|---|---|---|
| 2,260,467 | 10/1941 | Le May | 273/94 R |
| 2,301,274 | 11/1942 | Greiser | 35/53 |
| 2,583,510 | 1/1952 | Ingram | 353/108 X |
| 3,036,496 | 5/1962 | Frederick et al. | 353/30 |
| 3,207,033 | 9/1965 | Guber | 353/17 |
| 3,336,681 | 8/1967 | Minasy | 353/35 X |
| 3,375,007 | 3/1968 | Meyer | 273/94 R |
| 3,547,441 | 12/1970 | Thornton | 273/94 R |
| 3,563,547 | 2/1971 | Marsh | 273/94 R |

FOREIGN PATENTS OR APPLICATIONS

| | | | |
|---|---|---|---|
| 434,763 | 9/1926 | Germany | 353/34 |

*Primary Examiner*—Anton D. Dechsle
*Attorney, Agent, or Firm*—Coffee & Sweeney

[57] ABSTRACT

Game apparatus which includes a projector and screen in conjunction with a plurality of film transparencies, so that the game "board" or setting is projected on the screen together with the playing pieces, and the progress of the game is determined by the projection of films in sequence. In the illustrated embodiment, there is provided a football game including a plurality of film strips of offensive and defensive plays which are projected on the screen in superimposed relation to provide the play action of two opposing teams.

8 Claims, 18 Drawing Figures

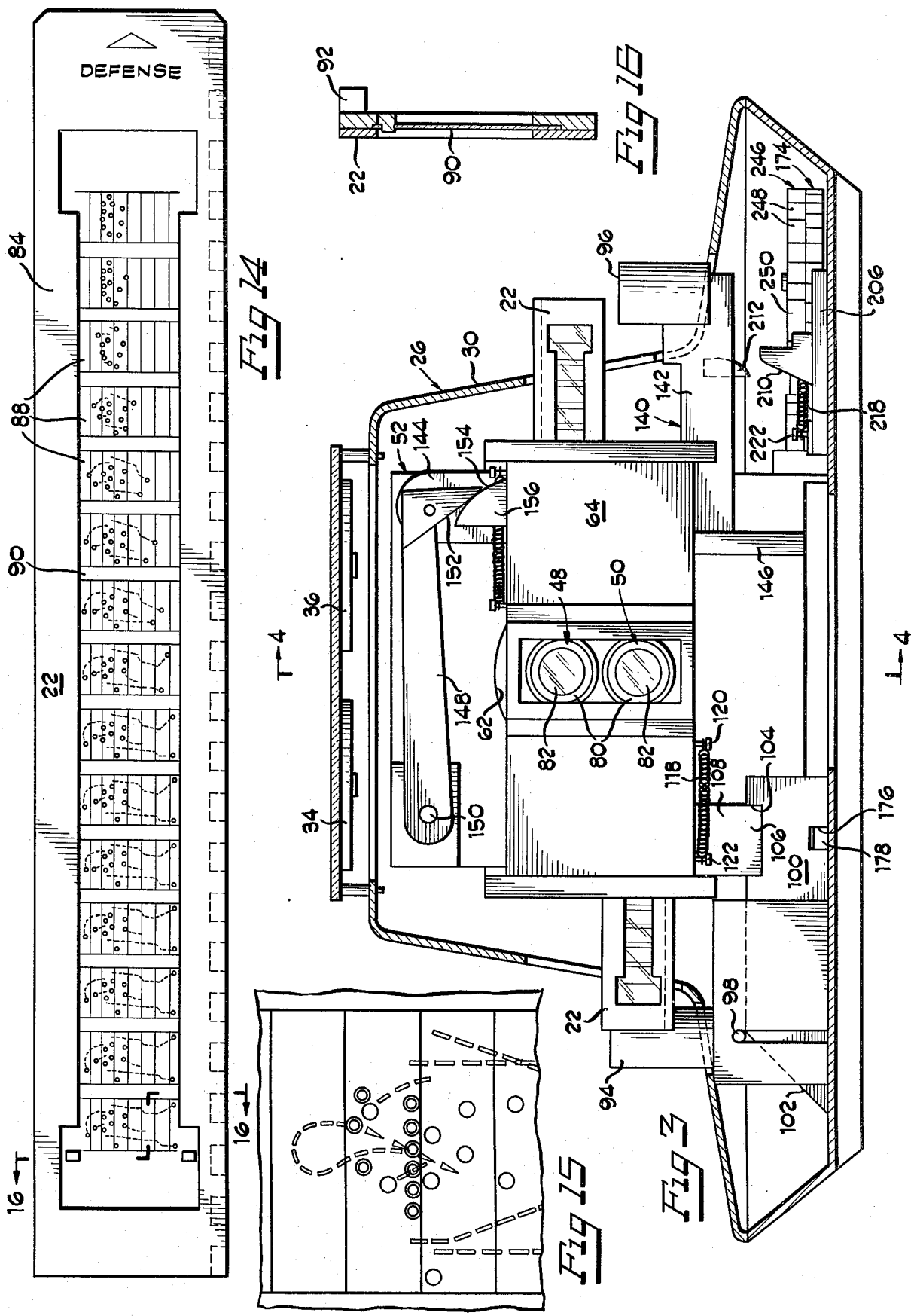

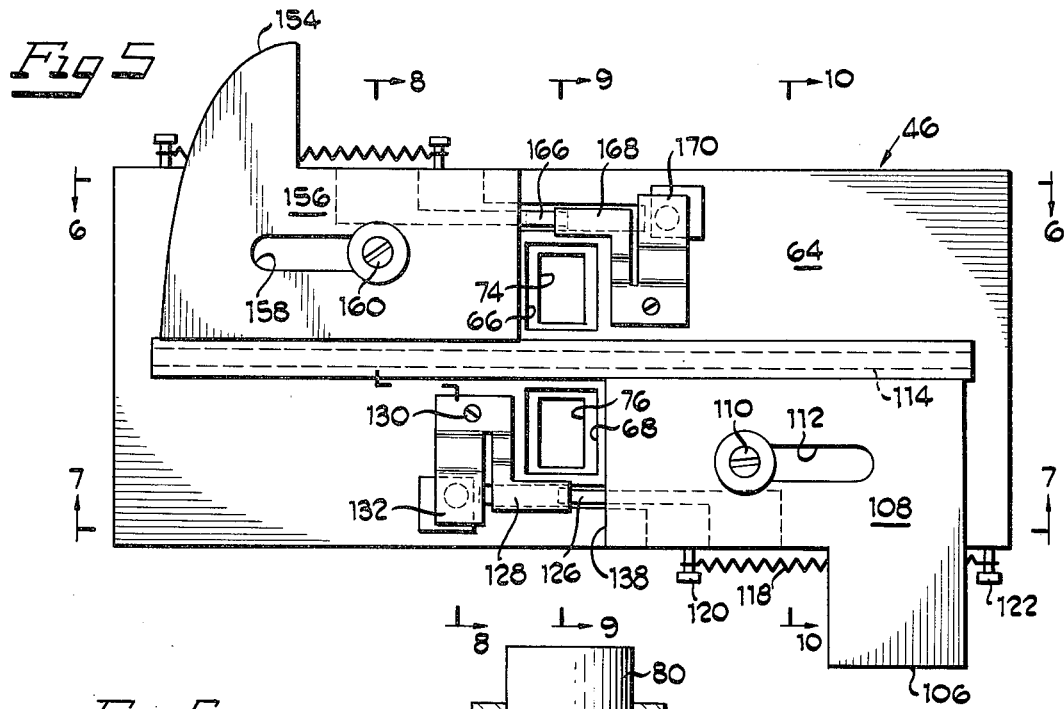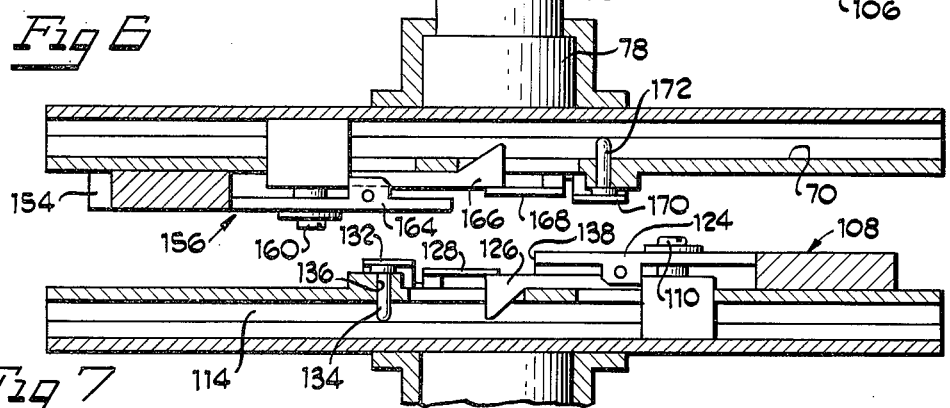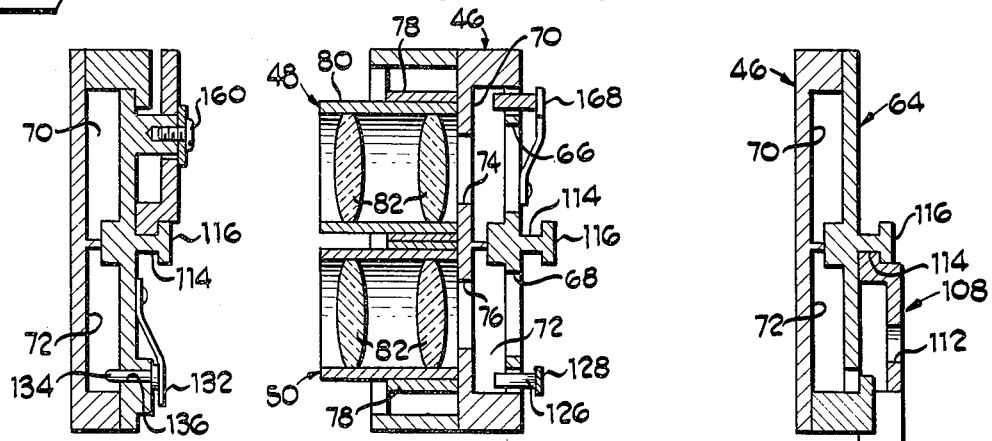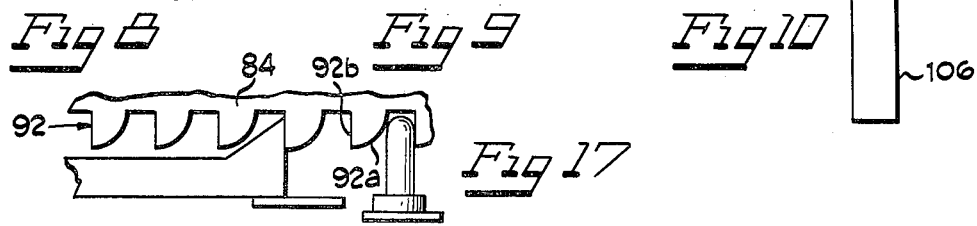

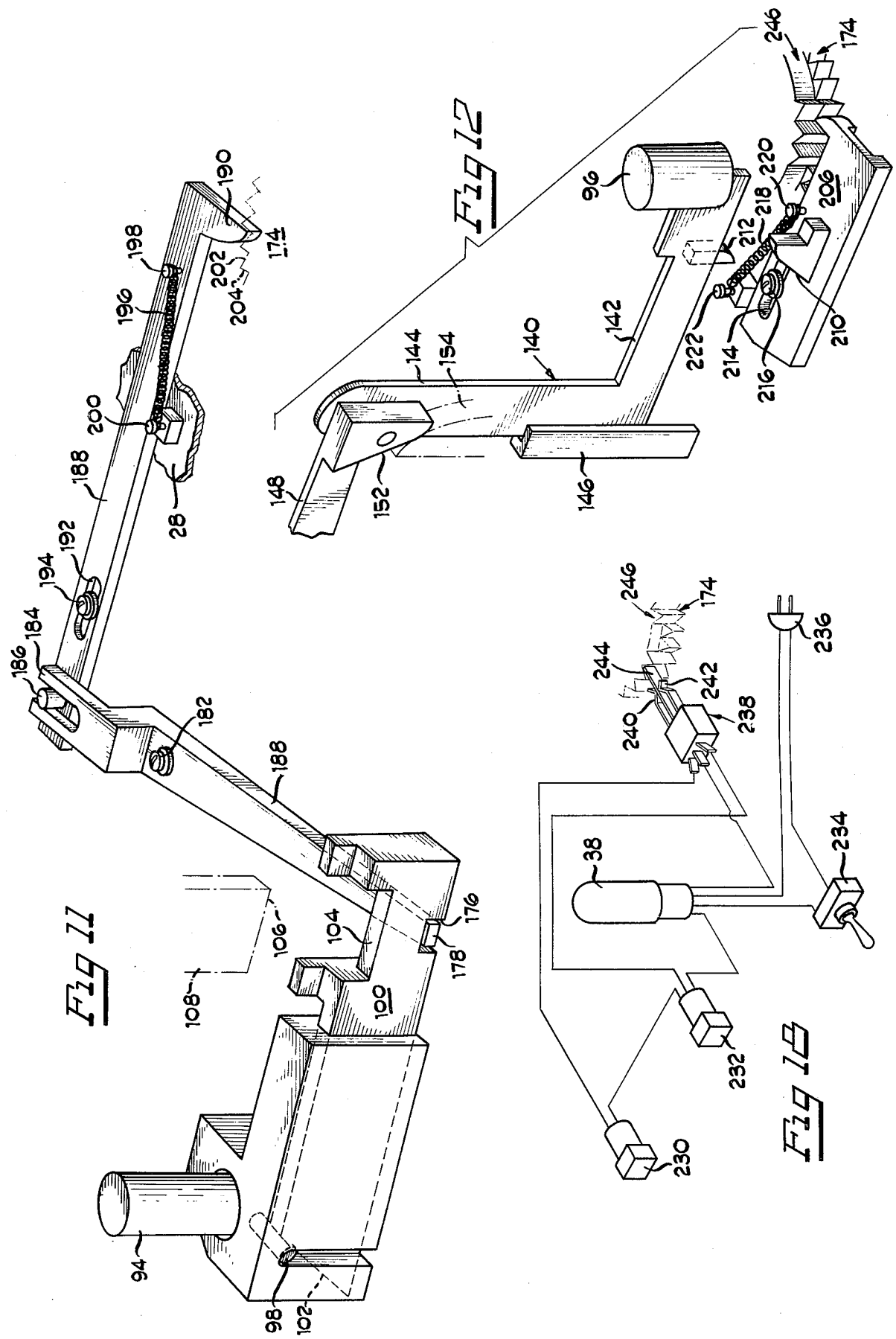

GAME APPARATUS

BACKGROUND AND SUMMARY OF THE INVENTION

This invention relates generally to game apparatus and is particularly directed to games involving the use of film transparencies in conjunction with a projector, whereby the game board and the changing situation of pieces during the play of the game are all projected on a screen or viewing surface.

Various board games have been provided over the years, which afford competition between opposing players in moving their playing pieces to achieve a particular goal. Usually, such games provide a rather static condition which changes slowly as individual playing pieces are moved by the opposing players in turn in an attempt to achieve a single purpose. It is the primary object of the present invention to provide game apparatus which affords the play of any number of different games through the use of film transparencies, wherein opposing players project competitive play situations in superimposed relation to one another. A more specific object of the invention is to provide a football game utilizing the game apparatus described above, wherein one player projects an offensive formation of football players on the screen and the other player projects a defensive formation of football players on the screen, and the players in turn project succeeding illustrations of the football players in different positions as the play progresses so as to determine the success or failure of the offensive play. Other objects and advantages of the invention will become apparent from the following description of the preferred embodiment illustrated in the accompanying drawings.

In the drawings:

FIG. 3 is a front elevational view of the projector, with portions broken away and in section in order to more clearly illustrate certain of the structure within the projector housing;

FIG. 5 is a rear elevational view of the film transparency support means, taken generally along the line 5—5 in FIG. 2;

FIG. 6 is a sectional view taken along the line 6—6 in FIG. 5;

FIG. 7 is a sectional view taken along the line 7—7 in FIG. 5;

FIG. 8 is a sectional view taken along the line 8—8 in FIG. 5;

FIG. 9 is a sectional view taken along the line 9—9 in FIG. 5;

FIG. 10 is a sectional view taken along the line 10—10 in FIG. 5;

FIG. 11 is a fragmentary perspective view of a portion of the projector operating mechanism which is also shown at least in part in FIGS. 2 and 3;

FIG. 12 is an exploded perspective view of a portion of the projector operating mechanism which is also seen in FIGS. 2 and 3;

FIGS. 13 and 14 are enlarged plan views of mounted transparencies used with the invention;

FIG. 15 is an enlarged fragmentary view of the viewing screen, illustrating the superimposed images on the screen projected from two separate transparencies;

FIG. 16 is an enlarged cross sectional view taken along the line 16—16 in FIG. 14;

FIG. 17 is an enlarged fragmentary view of a transparency mount and structure for moving same within the projector housing; and FIG. 18 is a diagrammatical illustration of the electrical circuit portion of the projector.

Figure 1:
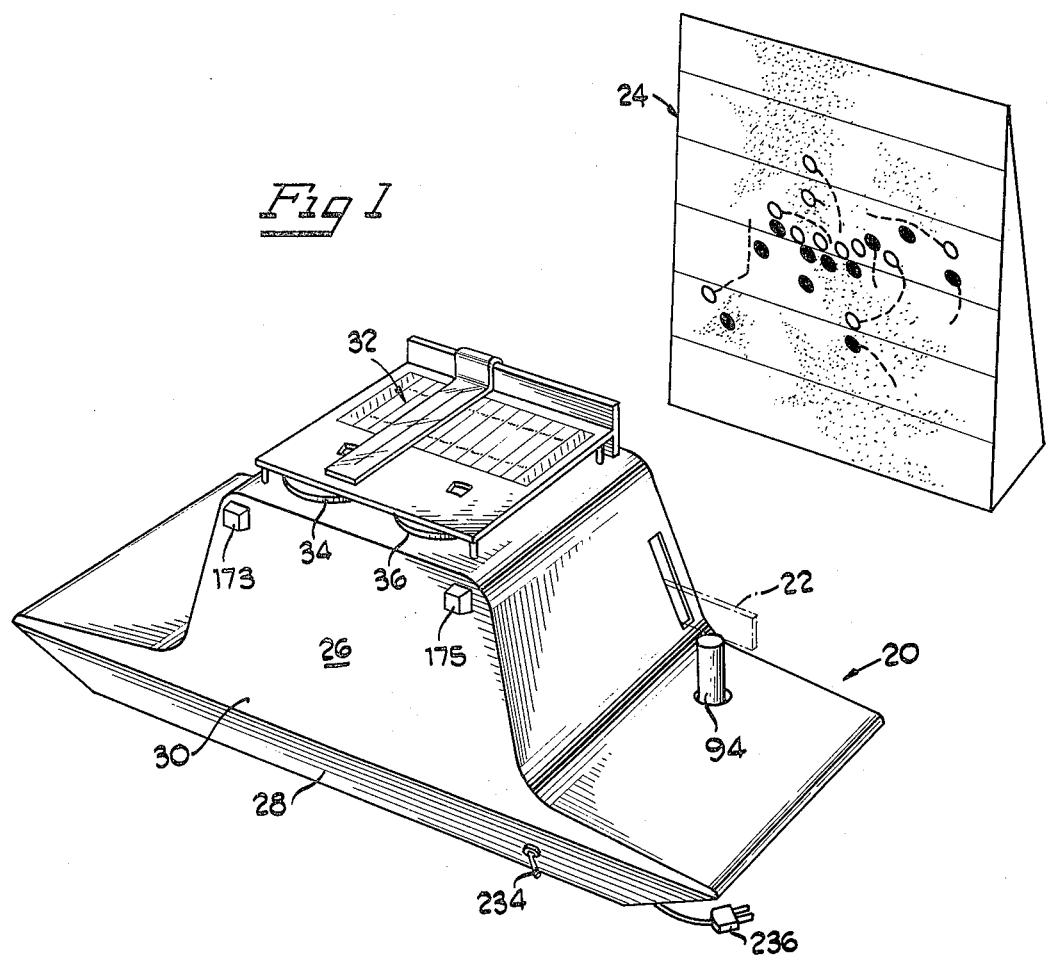
FIG. 1 is a perspective view of game apparatus embodying the invention.
Figure 4:
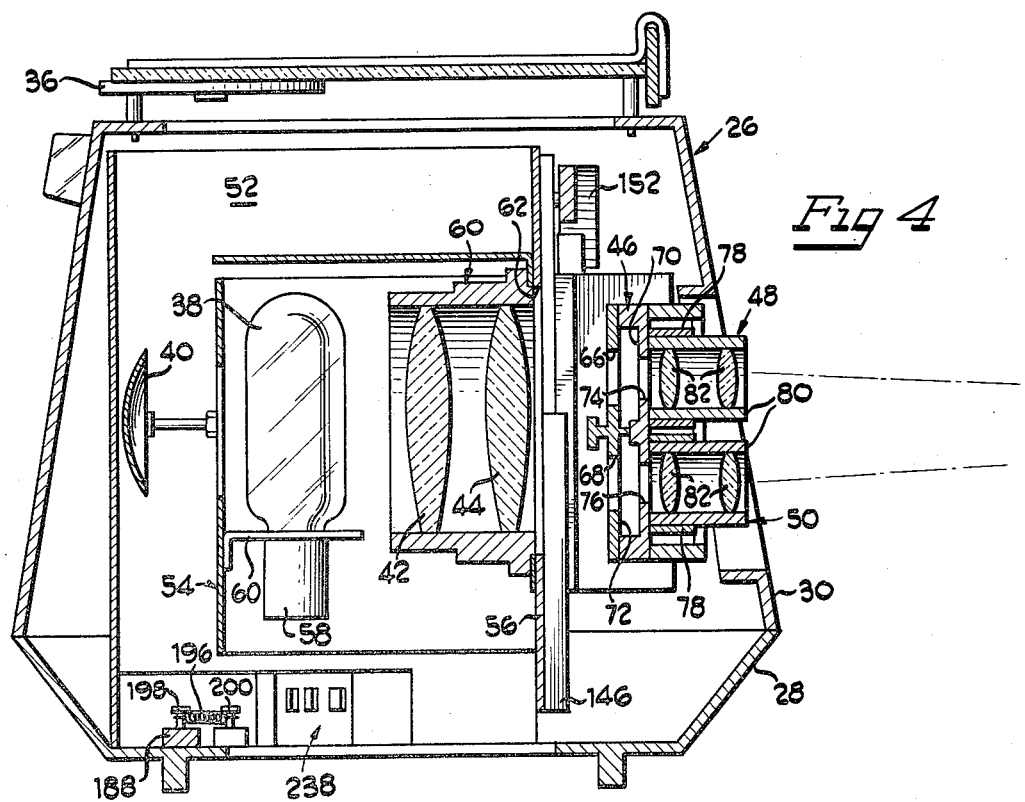
FIG. 4 is a cross sectional view taken generally along the line 4—4 in FIG. 3.

With reference particularly to FIGS. 1–4 of the drawings, it will be seen that the invention employs the use of a film projector 20 and film transparencies 22 to present a game on a viewing surface and to provide for competitive changing of the position of game pieces through the use of various film transparencies selected by the players. During the play of the game one of the players projects the image of a particular game situation on the viewing surface, and the opposing player then projects another image on the viewing surface in superimposed relation to the first projected image in an effort to thereby position his playing pieces to secure an advantage over his opponent. The game apparatus disclosed herein will be described with respect to a football game, but it will be understood that the invention contemplates and suggests the use of the disclosed game apparatus in conjunction with the play of other games.

In the preferred embodiment of the invention illustrated in the accompanying drawings, there is provided a film projector 20 (FIG. 1) which is constructed so as to afford simultaneous projection of two separate film transparencies 22 in superimposed relation on a screen 24. The projector 20 includes a housing 26 having a base portion 28 and a cover portion 30, with the cover portion mounting a miniature football field 32 providing means for recording the advancement and/or loss of yardage by the offensive team. Adjacent the miniature football field 32 are a pair of movable dials 34, 36 for indicating the number of the down and the number of yards needed for a first down.

The base 28 supports a projection system which includes a light 38 (FIGS. 2 and 4) and reflector 40, a pair of condensers 42, 44, slide receiving means 46 and a pair of objective lens systems 48 and 50. A generally rectangular metal box 52 is suitably fixed to the base 30 and its lower end contains the light source 38, reflector 40, and condensers 42, 44. More particularly, the box 52 contains a U-shaped frame 54 which is bolted to a front plate 56 and inwardly turned ends 52a at the front of the metal box, with frame 54 and plate 56 providing a support for the light source, condenser and reflector. The light 38 is mounted in a socket or receptacle 58 carried by a bracket 60 on the rear wall of the U-shaped frame 54, which wall also has bolted thereto the concave reflector 40. The plate 56, which is secured to the front of the U-shaped frame 54 and to the forward wall of the box 52, provides a support or mount for a cylindrical condenser lens housing 60 supporting the pair of axially aligned, spaced-apart light condensing lenses 42, 44. The light 38, reflector 40 and condensers 42, 44 are aligned axially to provide for concentration of parallel light rays through an opening 62 in the forward wall of the box.

The transparency mount receiving means 46 and projecting lenses 48, 50 are supported on a plate 64 secured to the forward wall of the box 52 and having a central opening affording passage of light from the condensers and through openings 66, 68 in the mount receiving means and through the objective lens system. The mount receiving means or carrier 46 is in the form of a generally rectangular tubular housing (FIGS. 7–10) providing an upper channel portion 70 and a lower channel portion 72 for receiving two transparency mounts in position for movement transversely of the axis of the two objective lens systems. Each channel portion also includes a pair of openings 74, 76 disposed, respectively, at a position along the axis of openings 66, 68 and the associated objective lens system 48, 50. Each objective lens system comprises a cylindrical mounting portion 78, preferably adjustably receiving a tubular holder 80 which supports a pair of spaced-apart, double convex lenses 82. In the illustrated embodiment the upper and lower objective lens systems 48, 50 are positioned with their axes in converging relation, so that the images projected by the two objective lens systems are superimposed in registry with each other at a predetermined distance in front of the projector. Suitable known means may be provided for angular adjustment of the lens positions in the event it is desirable to provide for superimposition of the images at various distances from the projector.

In the illustrated game apparatus, the film transparencies 22 are arranged in sets, with each set carried by an elongated frame or mount 84, as seen particularly in FIGS. 13–16. Each set comprises a plurality of individual frames 88 arranged in a strip 90 suitably fixed within the mount. Each strip includes a sequence of movements relating to a particular play, either defensive or offensive, so that each mount provides a complete play action for one football play. The mount 84 includes along one edge thereof a series of teeth or serrations 92 for a purpose to be described later in the specification.

The transparency mount receiving means 46 also includes structure which is cooperative with the individual transparency mounts 22 to effect sequential movement of the mount through one of the channel portions 70, 72 to thereby effect sequential registration of each frame 88 with the associated objective lens system 48 or 50 to afford projection of the images on viewing screen 24.

More particularly, and with reference to FIGS. 2, 3, 5, 11 and 12, separate manually operable means is provided for effecting sequential movement of each of two transparency mounts through the projector. As noted in FIGS. 2 and 3, there is provided a button 94 on the left side of the projector for moving the lowermost mount and a button 96 on the right side of the projector for moving the upper mount. Each of these buttons is mechanically connected with a movable pawl on the carrier plate 64, and such pawl is cooperable with the teeth 92 disposed along the face of the transparency mount to effect the required movement of the latter.

Button 94 on the left is depressable into a cylindrical opening in the base of the projector and includes a pin 98 adjacent its lower end for engaging and moving an elongated slide 100 (FIG. 11). As the pin 98 moves downwardly it presses against the inclined surface 102 on the edge of the slide and causes the latter to move to the right. The free end of slide 100 is formed with an upwardly facing rectangular cut-out portion 104 which receives the lower end 106 of an L-shaped plate 108 guidedly positioned on the front wall of the projector.

With reference to FIG. 5, it will be noted that the plate 108 is movably secured to the front wall 64 through means of a pin 110 and slot 112 connection with the wall. The upper edge of the plate is slidably confined in an elongated channel 114 (FIG. 10) formed by a rib 116 on the wall 64. A coil tension spring 118 is positioned between a pin 120 on the slidable plate 108 and a pin 122 on the projector wall, so as to bias the slidable plate 108 in a direction away from the objective lens 50, i.e. to the right in FIG. 5. The end of the slidable plate 108 adjacent the projection opening 68 in the projector front wall 64 (FIG. 7) includes a boss 124 providing a pivot mounting for a pawl 126. The pawl 126 extends into the lower channel portion 114 of the transparency mount receiving means and is biased into such position by a flat metal spring piece 128 fixed to a wall by a screw 130 or the like. The flat spring 128 also includes a portion 132 which presses against a stop pin 134 slidably supported in an opening 136 through the wall of the mount receiving assembly.

As the slidable plate 108 is moved toward the center of the projector when button 94 is depressed, the leading edge 138 (FIG. 5) of the plate passes across the viewing opening 68 and thereby blocks out the projection on any image. Also at such time the pawl 126, when in engagement with a serration or tooth 92 on the transparency mount 84 (FIG. 17) moves the mount to position or index the next frame of film for projection on the screen. The sliding motion of the mount 84 forces the stop pin 134 outwardly from engagement with the teeth of the mount, with the stop pin being moved upwardly over the curved tooth surface 92a and it then drops back into position against the straight wall surface 92b of the tooth, so as to positively index the position of the mount 84 and the frames relative to the projection opening 68 and lens 50. Button 94 having been released, the slide plate 108 then moves back to its normal position under the influence of the coil spring 118. Subsequent pressing of the button will, of course, repeat the described motion of mount 84 and present the next frame of the film strip in registry with lens 50 for projection of the image thereon.

In a similar fashion, button 96 on the right of the projector, as seen in FIG. 3, is operable to effect a predetermined incremental movement of the transparency mount supported in the upper channel portion 70 of the mount receiving assembly 46. As noted particularly in FIGS. 2, 3 and 12, the button 96 is formed on one end of an L-shaped member 140 having a horizontal leg 142 and a vertical leg 144 with the vertical leg portion being slidably received in a vertically extending channel portion 146 on the projector. The upper end of the vertical leg portion 144 is pivotally connected with a link 148 having its opposite end pivotally mounted at pin 150 on the front wall of the projector. The pivot connection between the link 148 and the vertical leg portion 144 includes an inclined cam surface 152 disposed for engagement with a curved upper edge portion 154 of a second slidable plate 156 disposed for movement along the upper part of the front wall 64. Looking at FIGS. 5, 6 and 8–10, the second slidable plate 156 includes a slotted opening 158 slidably engaging a pin 160, and the lower horizontal edge of the plate is guidedly restrained in an elongated horizontal channel portion 162 on the front wall. The portion of the plate adjacent the projection opening 66 is provided with a boss 164 (FIG. 6) 6) forming a pivot mounting for a pawl 166 in the same manner as that described with respect to the first slidable plate 108. The pawl 166 is biased toward the mount receiving channel 70 by a flat metal spring 168. The spring 168 also includes a separately flexible portion 170 bearing against the head of the stop pin 172 extending into the mount receiving channel. The operation of the second slidable plate 156 is essentially identical with that of the first plate. As the button 96 is depressed, the inclined cam 152 moves downwardly against the arcuate surface 154 on the slidable plate 156 to force the latter toward the projection opening 66, i.e. to the right in FIG. 5. During such movement, the pawl 166 moves the transparency mount to position the next frame for projection through the opening 66.

Associated with the operating buttons 94, 96 is mechanism for providing a random lighting of two signal lights 173, 175 which are disposed on the rearwardly facing wall of projector housing 26 (FIG. 1). More particularly, there is provided mechanical linkage between each of the operating buttons and a rotatable toothed element or gear 174 carried on the base of the projector housing. The right hand portion of the slide 100 includes a downwardly facing notch 176 which engages the free end 178 of a lever 180 pivoted on the housing at an intermediate portion thereof by means of a pin or screw 182. The opposite end of this lever includes a forked portion 184 slidably engaging a pin or boss 186 formed on a second lever 188 having a pawl 190 at its opposite end in engagement with the toothed periphery of gear 174. The lever is guidedly supported by a slot 192 and pin 194 connection with the housing base, and the pawl end is biased into engagement with toothed gear 174 by a coil spring 196 extending between a pin 198 on the lever and a pin 200 on the housing base. It will be seen, therefore, that as the slide 100 moves to the right in response to depressing button 94, the lever 180 is pivoted counterclockwise and thereby moves the second lever 188 to the left. The lengthwise movement of lever 188 causes the pawl 190 to slide over the curved edge 202 of a tooth and then drop back into engagement with the straight edge 204 of such tooth.

The other button 96 also has a mechanical connection with the gear 174 to provide similar motion of the gear in response to pressing the button 96. More particularly, there is provided a slidable plate 206 (FIG. 12) having a pawl 208 at one end engaging the gear 174 and having a vertically extending cam surface portion 210 which is engageable by a downwardly extending part 212 on the leg portion 142 to move the plate 206 and pawl 208 to the right. The plate 206 includes an elongated slot 214 engaging a screw or pin 216 fixed to the housing bottom wall, and a coil tension spring 218 is disposed intermediate a pin 220 on the plate and a pin 222 fixed to the bottom housing wall. As the button 96 is depressed, the pawl 208 moves over an inclined surface 202 on a tooth and drops into a position engaging a straight wall portion. Release of the button 96 causes the spring 218 to move the slide 206 back to the left and thereby rotate the gear 174 through one increment of travel. It will be noted particularly from FIG. 2 that the described rotation of the gear through operation of either button is unhampered by mechanism associated with the other button. When one of the buttons is depressed to rotate the gear 174, the inclined surface 202 of the teeth permits outward movement and repositioning of the pawl associated with the other button. Fixed to gear 174 for rotation therewith is a toothed cam wheel 246 which provides the random switching of lights 173, 175 through engagement thereof with a movable contact blade 244. As seen particularly in FIG. 2, wheel 246 has randomly positioned teeth 248 disposed about its periphery to provide blank areas 250 of varying length.

Figure 2:
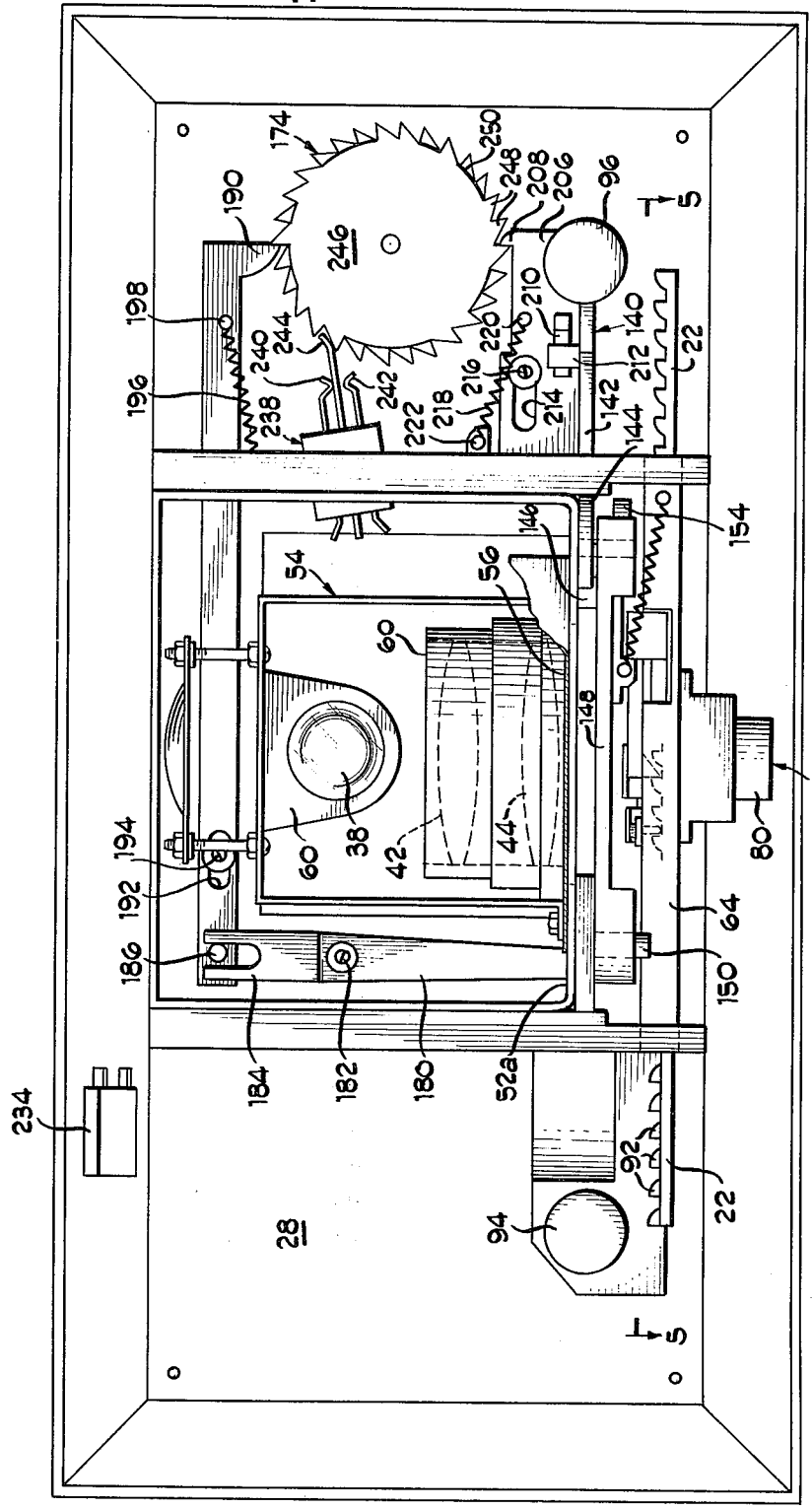
FIG. 2 is an enlarged top plan view of the projector game apparatus, with the top cover portion of the projector housing being removed to expose structural details.
Figure 13:
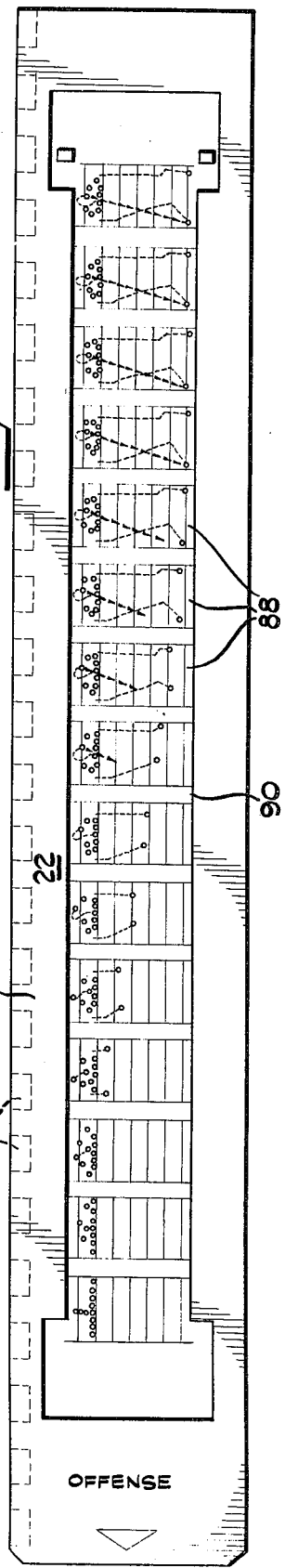

The electrical circuitry for the signal lights, as well as the projector lamp 38, is shown diagrammatically in FIG. 18. The circuit includes an off-on switch 234, a plug 236 for connection with a 110-volt source, projector lamp 38, the signal lamps 230, 232, and a two-way switch 238 for controlling current to the signal lights. The two-way switch 238 is also seen in FIG. 2 and comprises a contact 240 controlling the signal light 173 for the offense, a contact 242 controlling the defense light 175, and the movable center blade contact 244 positionable selectively against either of the two stationary contacts 240, 242 to close the associated circuit and thereby light one of the signal lights. Blade 244 is biased against contact 242 to normally close the circuit to signal light 175. The free end of the movable center blade contact 244 is positioned for engagement by the toothed cam wheel 246 as previously mentioned. Consequently, as the gear 174 rotates, the cam wheel 246 may move the center blade 244 into contact with contact 240 to light the offense signal 173, or it may spring back into contact with the other signal light contact 242 to light the defense signal 175.

In the use of the described apparatus in playing a game, each of two opponents or teams select a transparency mount 22 and place it in one of the two channels of the mount receiving means 46. In the illustrated embodiment, the apparatus is shown in conjunction with a football game, wherein there is provided a plurality of transparency mounts each including an offensive play and a plurality of transparency mounts each including a defensive play. Each illustrated play comprises a number of successive frames, with the first frame illustrating the initial play formation and the succeeding frames illustrating the progression or movement of the eleven players relative to the line of scrimmage in executing the play. Similarly, the defensive play mounts each include an initial defensive formation, which contemplates a particular play on the part of the offense, and the succeeding frames illustrate movement of the eleven defensive players to positions which hopefully will cause the offensive play to fail or otherwise stop the movement of the ball by the offensive team. The individual transparency mounts are suitably marked to indicate the type of offensive play or type of defense illustrated on the film strip. The offensive player selects one of the mounts and, without revealing it to the defensive player, inserts it into the upper channel of the mount receiving means in a position such that the initial formation of the players is projected on to the screen or viewing surface. The defensive player diagnoses the offensive formation as being a running play, pass, etc., and then selects a defensive play which he feels will be effective. The defensive slide is inserted in the lower channel 72 and the initial frame is moved into registry with the projection opening 68, whereupon the positions of the defensive players are projected onto the screen in registry with the first projected image, so that the defensive players are directly opposite the offensive players along the line of scrimmage. Each projected image includes at least some of the usual five yard line markers used in football, and lines on the two images will be in registry when the two images are superimposed. The offensive player again depresses his button to move the next frame into view to thereby show the initial movement of the offensive team i.e. the ball has been snapped and the quarterback and backfield have started forward movements. If the random signal light for the offensive team remains on, the offensive player may push the button again for further progression of the play. With the random action of the upper cam 246, the offensive player may be entitled to several moves or he may be stopped after the first move. If the offensive light goes out and the defensive light appears, the defensive player may then push his button to project the next frame which will indicate the initial motion of the defensive players. Again, the random action of the cam 246 may provide only one defensive move or it may provide several before the defensive light 175 goes out and the offensive light 173 appears. In this way, either party may gain an advantage through the random operation of the lights.

The slides illustrating the moves of the offensive team also include the illustration of a football so as to indicate the position of the ball in each frame, and passes or punts are illustrated through broken lines. For example, in FIG. 13 the eighth frame from the left includes a broken line indicating that the quarterback has passed the ball and at that point the ball is in the air five yards in advance of the line of scrimmage. Succeeding frames indicate the flight of the football to a point of completion 25 yards past the line of scrimmage. A sequence of defensive moves is illustrated in FIG. 14, with the movement of the players shown in dotted lines. Whenever two superimposed images show a defensive player intersecting or coinciding with the position of the football, the play is considered stopped. In the case of a pass the pass is intercepted, and in the case of a ground play the ball carrier is considered tackled at the point of intersection. If an offensive player intersects the position of the pass receiver, it is considered that the pass has been blocked and the pass is incomplete. Upon completion of a play the slides are withdrawn and new slides are then inserted and used in the same manner.

We claim:

1. Game apparatus comprising a film projector including a light source, condenser, and a pair of objective lens systems, means on the projector for receiving two film transparencies in positions intermediate the condenser and each of said objective lens systems so that each system is operative to project an image of the respective transparency, said lens systems being arranged with their axes in non-parallel relation so that the projected images are superimposed on each other on a viewing surface, a plurality of film transparencies each illustrating a game situation involving placement of pieces or players in different positions on the game playing area at different stages during the play of a particular game, said transparencies being arranged in sets for each of two or more opposing players, so that the game situation depicted by a first film transparency of one player is affected by the game situation depicted by a second film transparency of an opponent which is projected in superimposed relation to the image of said first transparency, each set of said transparencies comprising a plurality of mounts each bearing a plurality of transparencies arranged in series, said receiving means including means for simultaneously supporting two of said mounts, means on said projector for moving each of said mounts to present the individual transparencies thereon in registry with one of said objective lens systems including a separately operable mechanism for engaging and moving each of said mounts sequentially to thereby project an image from each of said transparencies thereon in sequence with each player controlling the movement of his mount on the projector, and signal means on said projector operated randomly by said separately operable mechanism to designate which of the two players is to next effect movement of his transparency mount.

2. Game apparatus as set forth in claim 1, wherein said film transparencies include diagrams of football plays, with one set of transparencies illustrating positions and movement of defensive players and the other set illustrating positions and movements of offensive players.

3. Game apparatus comprising a film projector, a plurality of film transparencies each illustrating a game situation with the transparencies comprising a plurality of film strips for opposing players with each strip bearing a plurality of transparencies arranged in series, means on said projector for receiving and supporting at least two of said strips simultaneously in position for viewing, means on said projector for providing viewing of two separate strips simultaneously with the images thereon superimposed whereby the game situation illustrated on one of said transparencies is affected by the illustrations on the second transparency superimposed thereon, means for moving said strips to present the individual transparencies in registry for viewing including separately operable mechanism for engaging and moving each of said strips whereby each player controls the movement of his respective strip on the projector, and signal means on said projector operated randomly by said moving mechanism to designate which player is to next effect movement of his film strip.

4. Game apparatus as set forth in claim 3, wherein said separately operable mechanism provides for sequential movement of a mount to thereby project an image from each of said transparencies thereon in sequence.

5. Game apparatus as set forth in claim 3 wherein said film transparencies include diagrams of football plays, with one set of transparencies illustrating positions and movments of defensive players and the other set illustrating positions and movements of offensive players.

6. Game apparatus as set forth in claim 3 wherein said indicating means is a signal light.

7. Game apparatus comprising a housing for positioning on top of a supporting surface such as a table or the like, film projecting means mounted on said housing, a plurality of film strips each bearing a plurality of transparencies each illustrating a game situation, said film transparencies including diagrams of football plays, with one set of transparencies illustrating positions and movements of defensive players and the other set of transparencies illustrating positions and movements of offensive players, the transparencies of each strip being arranged in series with each transparency on each strip providing one frame of a coordinated sequential series of play-by-play frames on each strip, means on said housing for receiving and supporting said strips simultaneously for viewing a game situation as illustrated by an image from one of the transparencies of one of the strips superimposed for viewing on an image from a transparency on a second strip to thereby illustrate a game situation represented by the two superimposed images, means on said housing separately operable for each of said strips to move each of said strips individually to present the individual images thereon in superimposed registry, and separate actuating means for each of said operable moving means for operation by individual players of the game to provide increment advancement of the strips by an individual player to change the game situation depicted by the superimposed images.

8. Game apparatus comprising a housing for positioning on top of a supporting surface as a table or the like, film projecting means mounted on said housing, a plurality of film strips each bearing a plurality of transparencies each illustrating a game situation, the transparencies of each strip being arranged in series with each transparency on each playing strip providing one frame of a coordinated sequential series of play-by-play frames on each strip, means on said housing for receiving and supporting said strips simultaneously for viewing a game situation as illustrated by an image from one of the transparencies of one of the strips superimposed for viewing on an image from a transparency on a second strip to thereby illustrate a game situation represented by the two superimposed images, means on said housing separately operable for each of said strips to move each of said strips individually to present the individual images thereon in superimposed registry, separate actuating means for each of said operable moving means for operation by individual players of the game to provide incremental advancement of the strips by an individual player to change the game situation depicted by the superimposed images and signal means operated randomly by said separately operable mechanism to designate which of the two players is to next effect movement of his transparency strip.

* * * * *

UNITED STATES PATENT OFFICE
CERTIFICATE OF CORRECTION

Patent No. 3,973,773    Dated August 10, 1976

Inventor(s) MARVIN GLASS et al

It is certified that error appears in the above-identified patent and that said Letters Patent are hereby corrected as shown below:

Column 8, line 26 (claim 3, line 9), after "separate"

insert -- transparencies of two separate --.

Column 8, line 47 (claim 5, line 4), change "movments" to

--movements--.

Column 9, line 13 (claim 8, line 2), after "surface" insert

--such--.

Signed and Sealed this

Twenty-eighth Day of December 1976

[SEAL]

Attest:

RUTH C. MASON
Attesting Officer

C. MARSHALL DANN
Commissioner of Patents and Trademarks